United States Patent

Sakuma et al.

[11] Patent Number: 5,416,508
[45] Date of Patent: May 16, 1995

[54] CATV SYSTEM WITH TRANSMISSION OF PROGRAM SCHEDULES, LINKED PROGRAM BROADCASTS, AND PERMISSIVE ORDERING PERIODS

[75] Inventors: Kazushi Sakuma; Eiji Ohga; Masahiko Kawasaki; Kimihito Harada; Tatsuo Takahashi; Ruysuke Tozaki, all of Tokyo, Japan

[73] Assignee: Pioneer Electronic Corporation, Tokyo, Japan

[21] Appl. No.: 278,123

[22] Filed: Jul. 21, 1994

Related U.S. Application Data

[63] Continuation of Ser. No. 964,304, Oct. 21, 1992, abandoned.

[30] Foreign Application Priority Data

Oct. 22, 1991 [JP] Japan .................................. 3-274340
Oct. 28, 1991 [JP] Japan .................................. 3-281448
Oct. 28, 1991 [JP] Japan .................................. 3-281449

[51] Int. Cl.⁶ .............................................. H04N 7/16
[52] U.S. Cl. ............................................ 348/3; 348/7; 348/10; 348/570; 348/906; 455/2; 455/4.2; 455/6.1
[58] Field of Search ............... 348/3, 7, 10, 12, 569, 348/570, 731, 734, 906; 358/86; H04N 7/16, 7/173, 5/50, 5/44; 455/4.2, 2, 5.1, 6.1, 6.2

[56] References Cited

U.S. PATENT DOCUMENTS

| | | | |
|---|---|---|---|
| 4,455,570 | 6/1984 | Saeki | 358/86 |
| 4,691,351 | 9/1987 | Hayashi | 358/84 |
| 4,706,121 | 11/1987 | Young | 348/906 |
| 4,885,775 | 12/1989 | Lucas | 455/4.2 |
| 4,947,244 | 8/1990 | Fenwick | 358/86 |
| 5,003,384 | 3/1991 | Durden | 455/2 |
| 5,027,400 | 6/1991 | Baji | 358/86 |
| 5,047,867 | 9/1991 | Strubbe et al. | 348/569 |
| 5,168,353 | 12/1992 | Walker et al. | 348/6 |
| 5,172,413 | 12/1992 | Bradley | 358/86 |
| 5,247,347 | 9/1993 | Litteral et al. | 348/7 |
| 5,315,392 | 5/1994 | Ishikawa et al. | 348/570 |

FOREIGN PATENT DOCUMENTS

| | | | |
|---|---|---|---|
| 15507 | 12/1990 | European Pat. Off. | H04N 7/173 |
| 0227486 | 10/1986 | Japan | H04N 5/445 |
| 185180 | 7/1988 | Japan | H04N 7/160 |
| 190486 | 8/1988 | Japan | H04N 7/173 |
| 199979 | 8/1990 | Japan | H04N 7/160 |
| 4122179 | 4/1992 | Japan | H04N 5/445 |

Primary Examiner—James J. Groody
Assistant Examiner—Chris Grant
Attorney, Agent, or Firm—Sughrue, Mion, Zinn, Macpeak & Seas

[57] ABSTRACT

A CATV center facility transmits, together with the television signals of a plurality of programs, display control data indicating program names and selection numbers of the respective programs and channel data indicating the numbers of channels on which the respective programs are being broadcast or to be broadcast. A terminal apparatus detects the program names, selection numbers and channel numbers from the display control data and the channel data, and makes a TV receiver display the detected program names and selection numbers in an associated manner. While looking at a picture thus displayed, a user selects a desired program by pushing a corresponding numeral button of a remote controller or a keyboard. In response to the program selection by the user, the terminal apparatus is tuned to the channel of the selected program.

10 Claims, 16 Drawing Sheets

FIG. 6(a)

| SELECTION NUMBER | CH NUMBER |
|---|---|
| 1 | 89 |
| 2 | 90 |
| 3 | 91 |
| 4 | 92 |
| 5 | 93 |
| 6 | 94 |
| 7 | 95 |
| 9 | FE* |

FIG. 6(b)

| SELECTION NUMBER | CH NUMBER |
|---|---|
| 1 | 96 |
| 2 | 97 |
| 3 | 98 |
| 4 | 99 |
| 5 | 100 |
| 6 | 101 |
| 8 | FD* |

*FE : NEXT CODE
FD : PREVIOUS CODE

FIG. 7
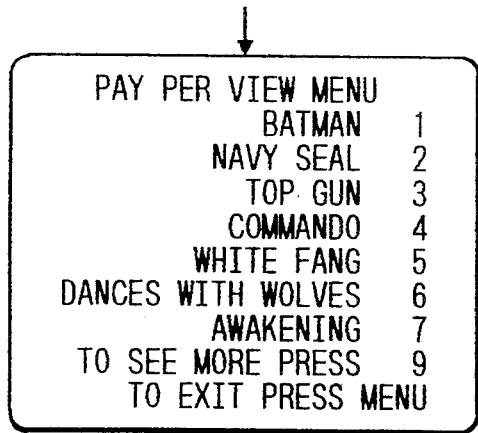
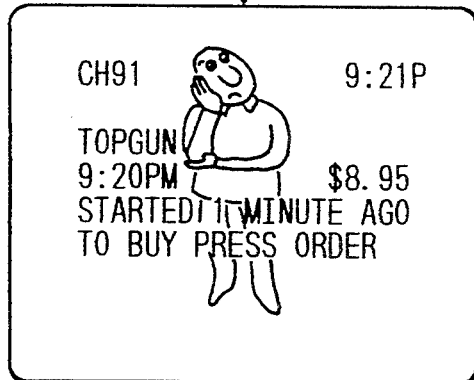
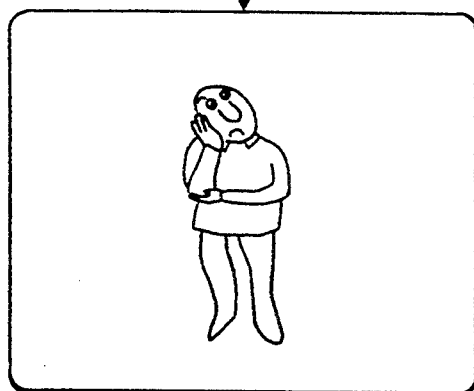

FIG. 10(a)
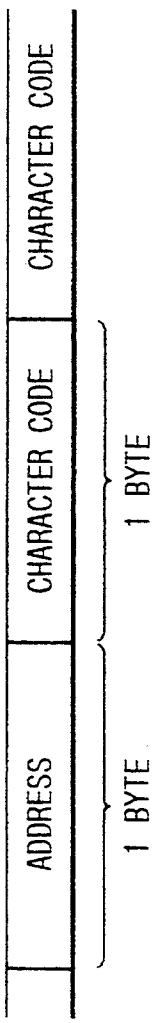
FIG. 10(b)
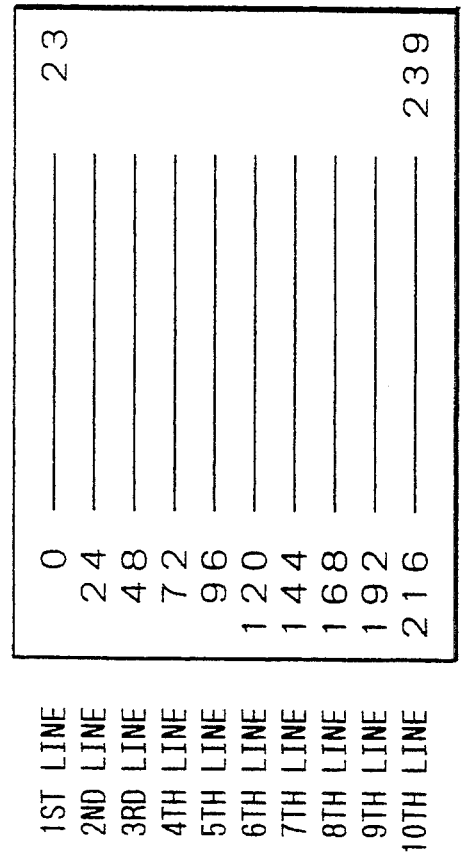
FIG. 9
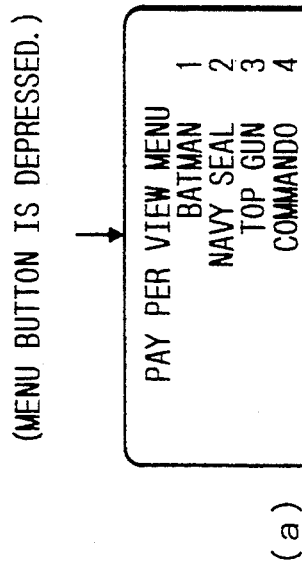
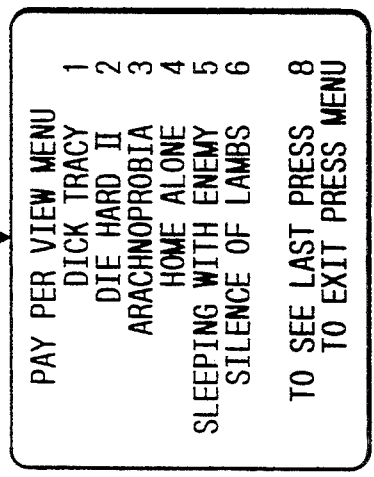

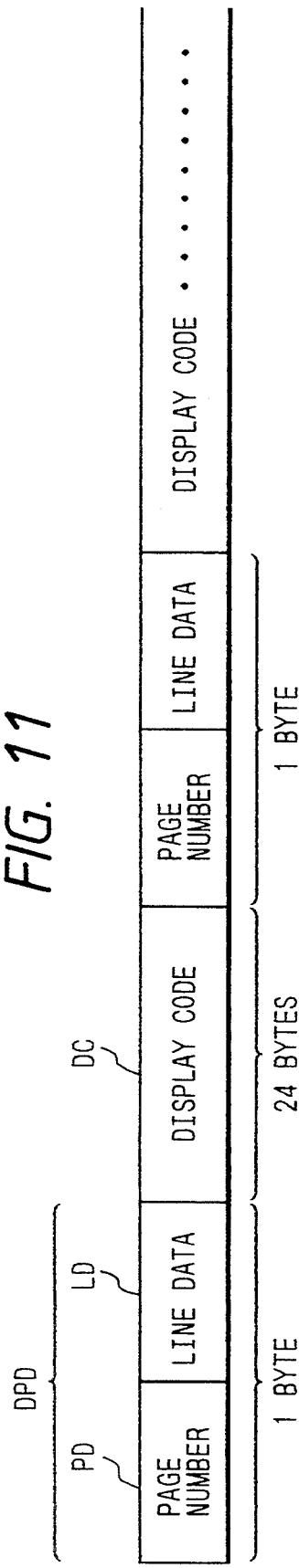

FIG. 13

| FORMAT | LD<br>LINK DATA | PD1 | | | PD2 | | |
|---|---|---|---|---|---|---|---|
| | | TITLE OF MOVIE | START TIME | LENGTH | TITLE OF MOVIE | START TIME | LENGTH |
| ch10 | 11 | A A A | 10:00 | 2 HOURS | A A A | 12:00 | 2 HOURS | ID1
| ch11 | 12 | A A A | 10:30 | 2 HOURS | A A A | 12:30 | 2 HOURS | ID2
| ch12 | 13 | A A A | 11:00 | 2 HOURS | A A A | 13:00 | 2 HOURS | ID3
| ch13 | 10 | A A A | 11:30 | 2 HOURS | A A A | 13:30 | 2 HOURS | ID4
| ch14 | FF | B B B | 10:00 | 3 HOURS | B B B | 13:00 | 3 HOURS | ID5

FIG. 18(a)

"AAA"

1 HOUR HAS PASSED FROM THE START OF THIS MOVIE.
PRESS THE ORDER BUTTON TO SEE THIS MOVIE.

FIG. 18(b)

"BBB"

15 MINUTES UNTIL START OF THIS MOVIE.
YOU CANNOT ORDER THIS MOVIE NOW.

CATV SYSTEM WITH TRANSMISSION OF PROGRAM SCHEDULES, LINKED PROGRAM BROADCASTS, AND PERMISSIVE ORDERING PERIODS

This is a continuation of application Ser. No. 07/964,304, filed Oct. 21, 1992, now abandoned.

BACKGROUND OF THE INVENTION

The present invention relates to a CATV (cable television or community antenna television) system.

In CATV systems, a center facility provides own programs and commercial broadcast programs on the air to a plurality of subscriber terminal apparatuses via transmission cables. In recent years, services of CATV systems include data transmission. Further, bi-directional CATV systems are now operated in which each terminal apparatus can transmit a signal (i.e., an up signal) to a center facility. CATV systems limitedly operated in schools, hotels, etc. are specifically called "CCTV (closed circuit television) system."

In the conventional CATV systems, to select a desired program to see it on a TV receiver, a user needs to refer to a program table that is distributed in advance, find a channel of the desired program, and operate a channel selection switch of a controller to set his terminal apparatus to that channel. To make the TV receiver display a certain message transmitted from the center facility, all the message data are stored in a buffer memory of the terminal apparatus. The message data read from the buffer memory are provided to a character generator, and an output of the character generator is superimposed on a video signal.

In the above CATV systems, the center facility is required to prepare a program table and distribute its copies in advance, and to broadcast programs in accordance with the program table thus prepared. However, the preparation of program tables needs some cost, and the flexibility of program organization is reduced, for instance, the programs cannot be altered once the program table is prepared. On the other hand, on the terminal apparatus side, a user cannot know without referring to the program table whether a desired program is scheduled to be broadcast. In addition, a procedure of program selection is complex.

Further, in the above conventional CATV systems, because the number of broadcast channels is insufficient, it is a general procedure that the same chargeable program is rebroadcast in unfixed time periods rather than, for instance, every 30 minutes. Therefore, when a viewer previously stopped watching a certain program in the midst of its broadcast and wants to see in another time the remaining a part of the same program that he failed to see, he needs to wait for the next rebroadcast or to record that program by a VCR etc. by checking in advance the start time of the next rebroadcast. However, a cumbersome procedure is required to see the rebroadcast program, or such an attempt sometimes results in a failure.

Further, the above conventional CATV systems employ a charging system in which a viewer is charged for chargeable programs on a program-by-program basis, as this system is called PPV (pay per view). In this system, a viewer is charged a full charge even if he has ordered a program in the midst of its broadcast. Since viewing of a certain program can be ordered any time during its broadcast, a viewer is charged a full charge even if he has ordered it only a short time before the end of the program.

SUMMARY OF THE INVENTION

An object of the present invention is to provide a CATV system in which the program organization can be performed with a high degree of flexibility, such that a user can easily select a desired program, and the system construction can be simplified.

Another object of the invention is to provide a CATV system in which where a user who previously stopped watching a certain program, can easily view the rest of the program during its rebroadcast.

Another object of the invention is to provide a CATV system which can prevent the ordering of a program when only a short time remains before the end of a program.

According to a first aspect of the invention, a CATV system comprises:

a center facility for transmitting, together with television signals of a plurality of programs, display control data indicating program names of the respective programs and channel data indicating channels numbers on which the respective programs are being broadcast or to be broadcast; and a plurality of terminal apparatuses, each comprising:
means for detecting the program names and the corresponding channel numbers from the display control data and the channel data;
display means for displaying the detected program names on a TV receiver;
means for receiving an instruction indicating selection of one of the program names being displayed on the TV receiver; and
means for tuning, based on the detected channel numbers, the terminal apparatus to a channel on which the selected program is being broadcast or to be broadcast.

According to a second embodiment of the invention, a CATV system comprises:

a center facility for transmitting a plurality of television signals of the same program on different linked channels at different periods, and for transmitting first data together with each of the television signals, the first data including link data indicating at least one of the linked channels having a predetermined linking relationship with an associated channel, and start time data indicating a start time of the program on the associated channel; and a plurality of terminal apparatuses, each comprising:
means for calculating, when viewing of the program on a first channel is stopped, a viewing period from the start time that is obtained from the start time data to a viewing suspension time;
means for calculating, when an attempt to restart the viewing of the program is made, elapsed times from the start times of the program on the respective linked channels that are selected based on the link data to a time of the restarting attempt, the start times being obtained from the start time data; and
means for tuning the terminal apparatus to one of the linked channels based on differences between the viewing period and the calculated elapsed times.

According to a third aspect of the invention, a CATV system comprises:

a center facility for transmitting, together with a television signal of a program, first data indicating an order permissible period during which the program can be ordered and second data indicating a start time of the program; and a plurality of terminal apparatuses, each comprising:
means for calculating an elapsed time from the start time of the program that is obtained from the second data to a present time; and
means for allowing an order of the program only when the elapsed time is within the order permissible period that is obtained from the first data.

BRIEF DESCRIPTION OF THE DRAWINGS

FIGS. 6(a) and 6(b) shows examples of data tables;

FIG. 7 shows pictures appearing on the screen of a TV receiver;

FIG. 9 shows pictures appearing on the screen of the TV receiver;

FIG. 10(a) shows a structure of display data;

FIG. 10(b) shows addresses for the display data;

FIG. 11 shows a structure of in-band data;

FIG. 13 shows a structure of in-band data;

FIG. 17 shows a structure of in-band data; and

FIGS. 18(a) and 18(b) show examples of pictures appearing on the TV receiver.

DESCRIPTION OF THE PREFERRED EMBODIMENTS

Embodiments of the present invention are described hereinafter with reference to the accompanying drawings.

Figure 1:
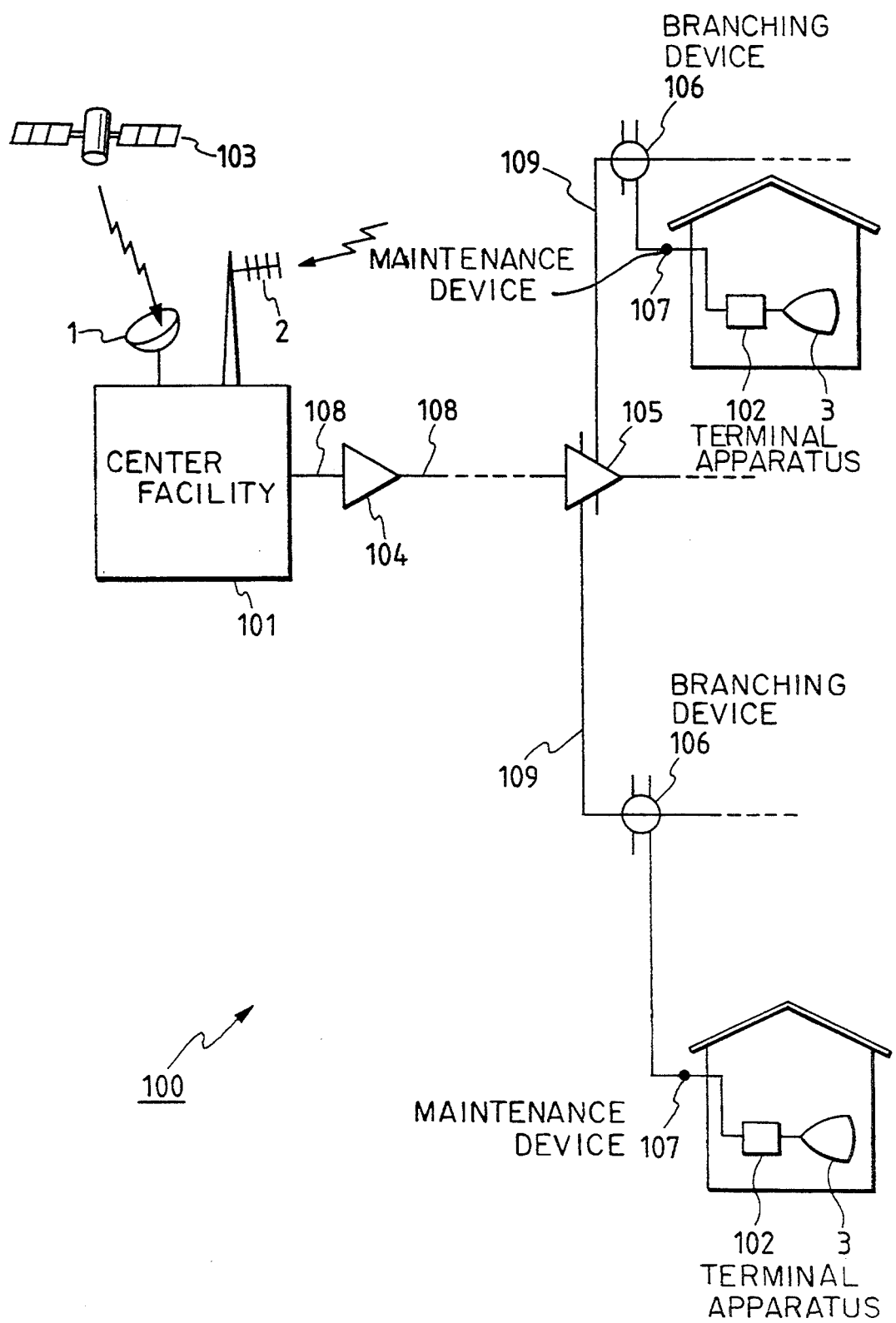
FIG. 1 is a block diagram showing a configuration of a CATV system according to the present invention.

FIG. 1 shows a configuration of a CATV system according to the invention. A CATV system 100 includes a center facility (head end) 101, a plurality of terminal apparatuses 102 and TV receivers 3 connected to the respective terminal apparatuses 102. The center facility 101 receives by an antenna 1 commercial programs transmitted from a satellite 103, and also receives ground-wave commercial programs by an antenna 2. Further, the center facility 101 produces its own programs and messages (described later). After subjected to a scrambling operation for prohibiting unauthorized viewing (in the case of the own programs), a television signal is distributed to the respective terminal apparatuses 102 via transmission paths consisting of a main transmission cable 108, a main line amplifier 104, a main line branching amplifier 105, branch transmission cables 109, branching devices 106 and maintenance devices 107. In general, the distribution service is performed based on contracts with users (viewers), who are charged accordingly.

The transmitted television signal is received by the terminal apparatus 102, subjected to a descrambling operation etc., and finally sent to the TV receiver 3 for viewing by the user.

Figure 2:
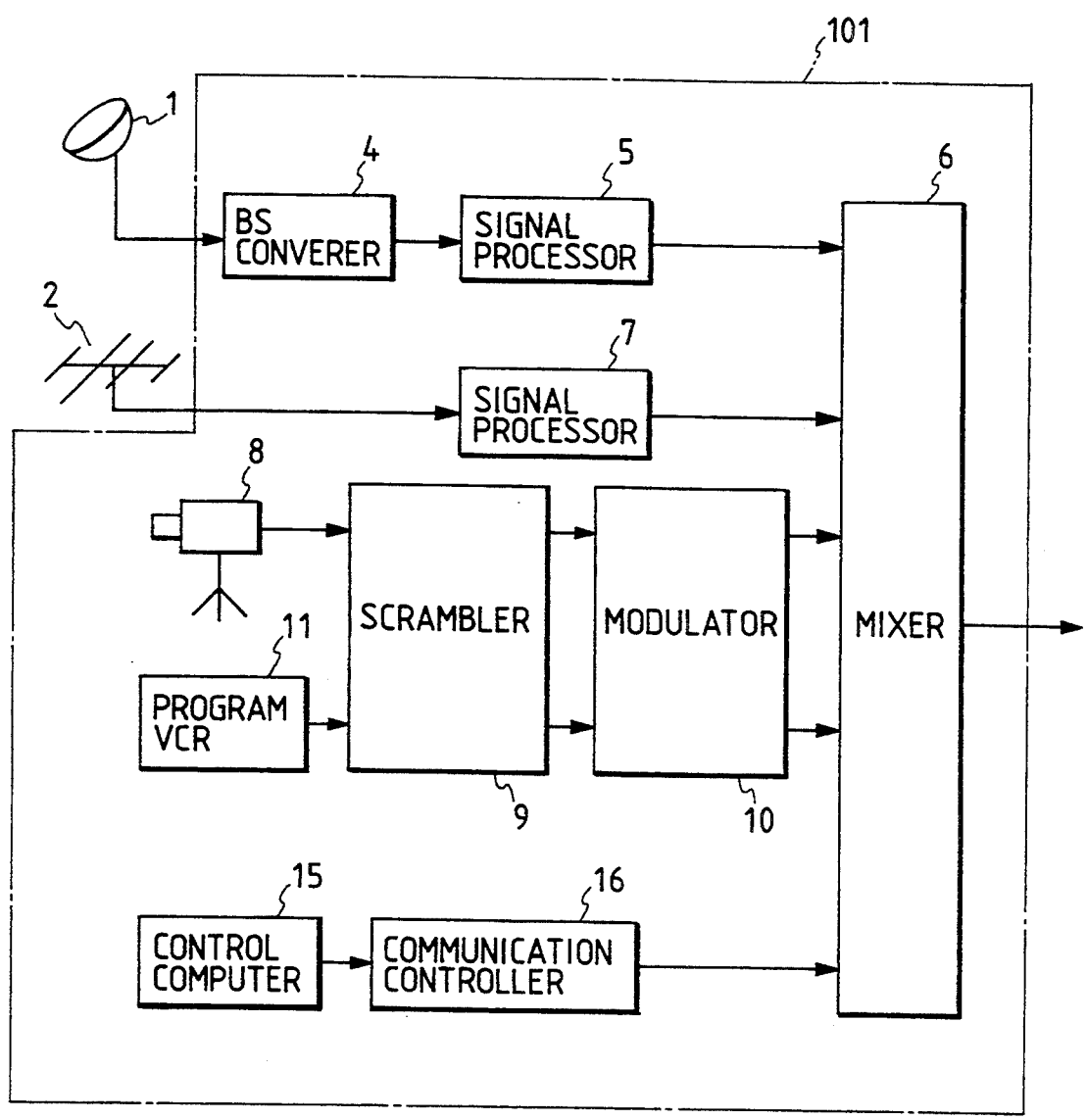
FIG. 2 is a block diagram showing a configuration of a center facility of FIG. 1.

FIG. 2 shows a configuration of the center facility 101. The center facility 101 includes the satellite-wave antenna 1, a BS converter 4 for frequency-converting a signal received by the antenna 1, a signal processor 5 and a mixer 6. A signal received by the ground-wave antenna 2 is also provided to the mixer 6 via a signal processor 7. A video signal from a TV camera 8 or a program VCR 11, (i.e., a signal of a chargeable program prepared in the center facility 101) is scrambled by a scrambler 9 to prohibit unauthorized viewing, modulated by a modulator 10, and finally provided to the mixer 6. A control computer 15 produces in-band data and data for FSK modulation that are to be transmitted to the terminal apparatus 102. The output data of the control computer 15 is subjected to a modulation to become the in-band data or to an FSK modulation in the communication controller 16, and then sent to the mixer 6.

Figure 3:
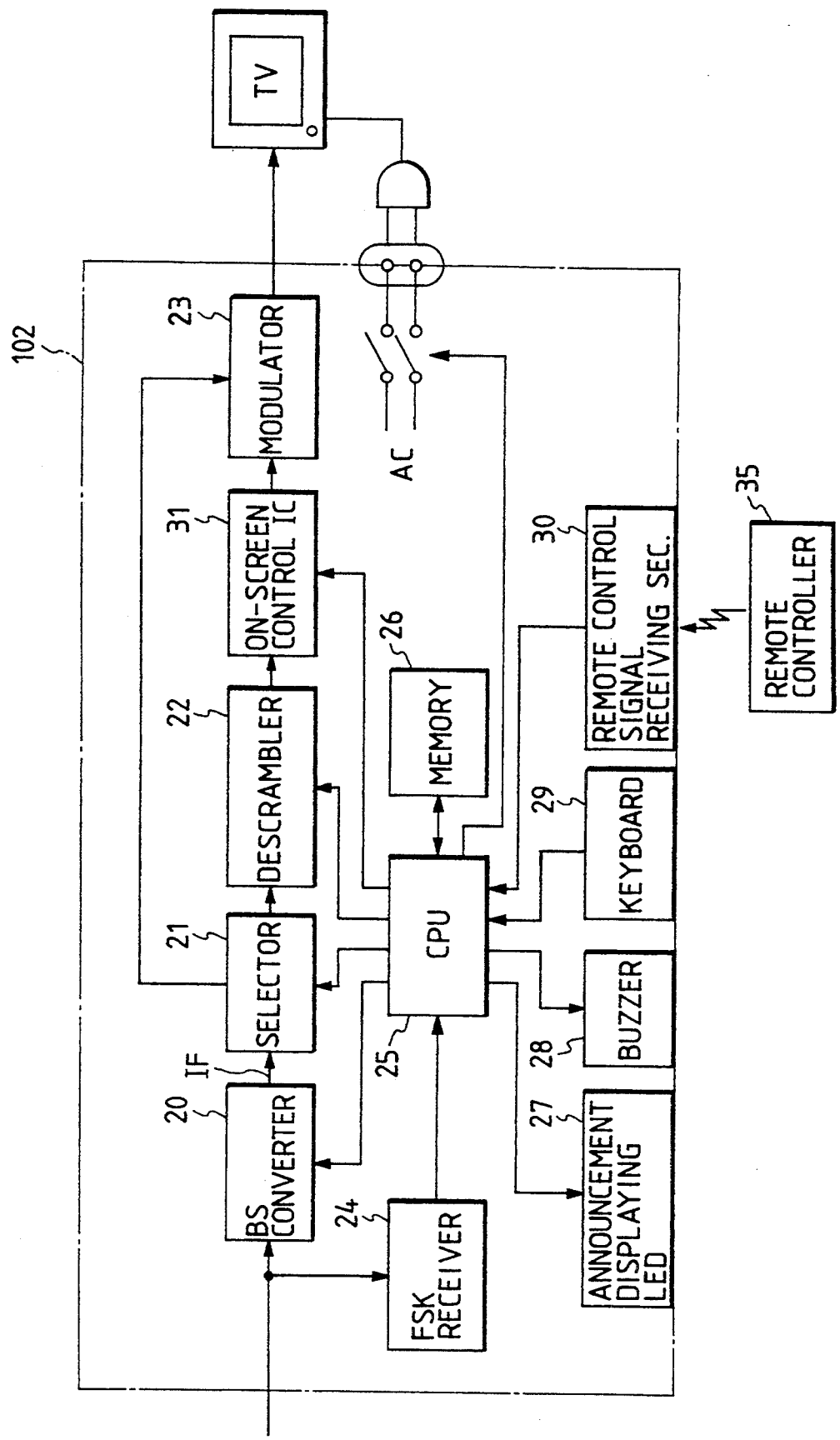
FIG. 3 is a block diagram showing a configuration of a terminal apparatus of FIG. 1.

FIG. 3 is a block diagram showing a configuration of the terminal apparatus 102. In the case of ordinary broadcast programs, an RF signal sent from the center facility 101 is input to a converter 20. The converter 20 selects a desired signal of a particular channel among input signals, and frequency-converts the selected signal to produce an intermediate frequency signal IF, which is provided to a descrambler 22 via a selector 21.

The descrambler 22 extracts scrambling data from the intermediate frequency signal IF by amplitude detection, and performs a descrambling operation in accordance with the extracted data. The descrambled signal is input to a modulator 23 via an on-screen control IC (OSDIC) 31, which frequency-modulates the audio signal part and amplitude-modulates the video signal part and provides a resultant RF signal to the TV receiver 3. In this operation, the on-screen control IC 31 superimposes a message and other information on the video signal of a selected channel. In the case of receiving a free broadcast of a free program and an all-around emergency broadcast of, e.g., an earthquake or storm warning, the intermediate frequency signal IF is directly provided from the selector 21 to the modulator 23, i.e., without passing through the descrambler 22.

A CPU 25 controls the entire terminal apparatus 102, i.e., a memory 26, announcement displaying LED 27, buzzer 28, on-screen control IC 31, etc. Under the control of the CPU 25, the memory 26 stores various character data and setting data for the terminal apparatus 102 and various data transmitted from the center facility 101, and the announcement displaying LED 27 is flashed or the buzzer 28 is activated to inform the user of the existence of a message transmitted from the center facility 101 or occurrence of some abnormal event. The on-screen control IC 31 performs various on-screen control operations such as signal superimposing.

A keyboard 29 has a key panel (not shown) used for the input of various data. A remote control signal receiving section 30 receives and processes an input control signal from a remote controller 35, and provides a resultant signal to the CPU 25.

Figure 4:
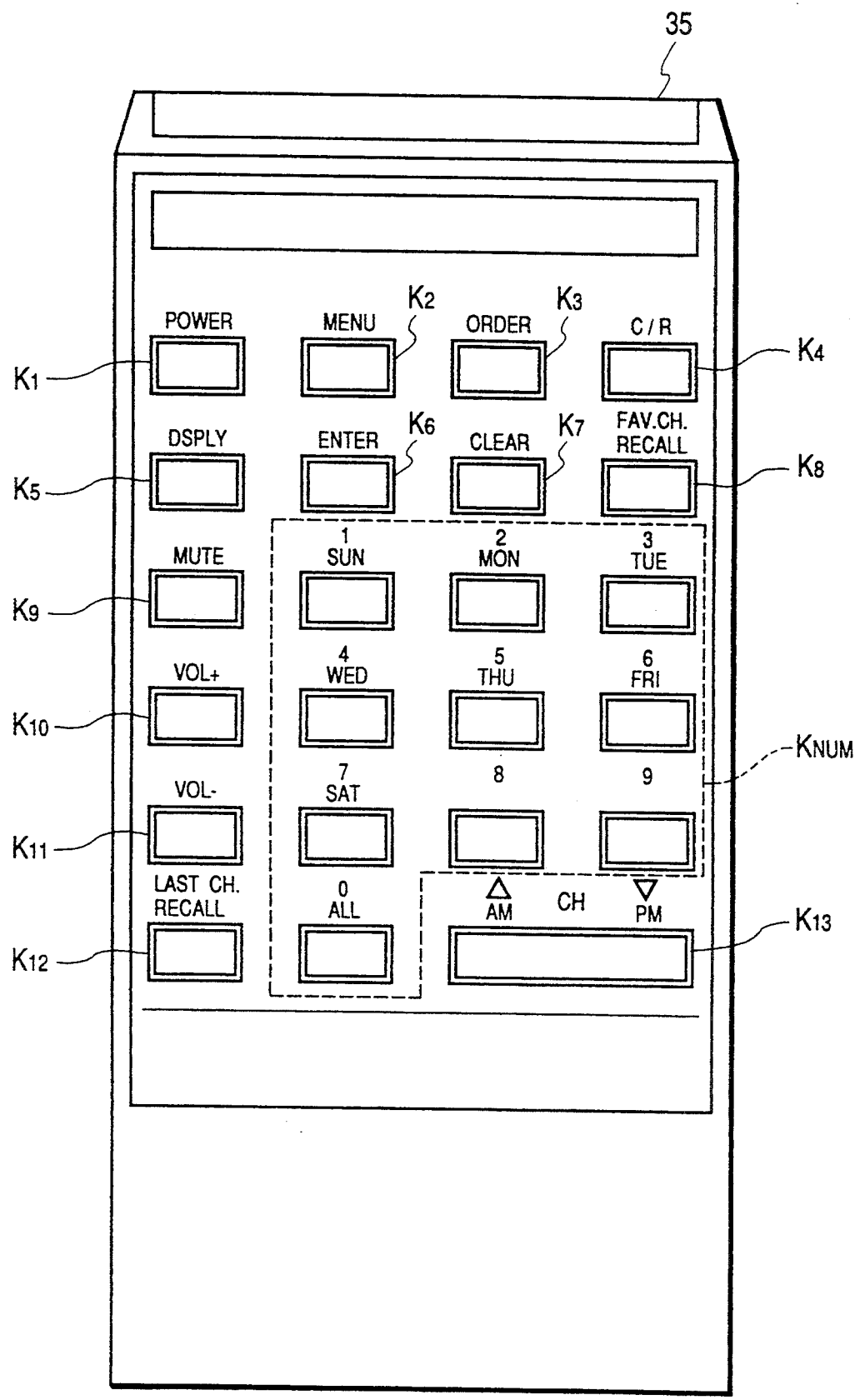
FIG. 4 shows an appearance of a remote controller.

Referring to FIG. 4, a configuration of a remote controller 35 is described below.

The remote controller 35 is constructed so as to transmit various data to a remote control signal receiving section 30 in the form of infrared light. The following buttons are provided on an operation panel of the remote controller 35: a power button $K_1$ for turning on/-off the power; menu button $K_2$ for displaying a menu picture; order button $K_3$ for requesting viewing of a chargeable program; channel/response changeover button $K_4$; display button $K_5$ for displaying various information on the TV receiver 3; enter button $K_6$ for confirming allowance of inputting various data; clear button $K_7$; memory recall button $K_8$ for reading out memory contents; mute button $K_9$ for muting an output audio signal of the TV receiver 3; volume-up button $K_{10}$; volume-down button $K_{11}$; last channel recall button $K_{12}$ for displaying on the TV receiver 3 a program of a channel selected immediately before the present channel; seesaw-like channel up/down button $K_{13}$; and numeral button group $K_{NUM}$ having ten buttons of a "1" button through a "0" button. In the case of setting a timer operation, the "1" through "7" buttons are used as days-of-the-week buttons (i.e., a Sunday button through a Saturday button), the "0" button is used as an every day button for designating all of Sunday through Saturday, and the channel up/down button $K_{13}$ is used as a morning/afternoon button. It is noted that keys equivalent to the above buttons are also provided on the key panel of the keyboard 29.

Next, an operation of the terminal apparatus 102 in a first embodiment is described with reference to FIGS. 5–7.

Figure 5:
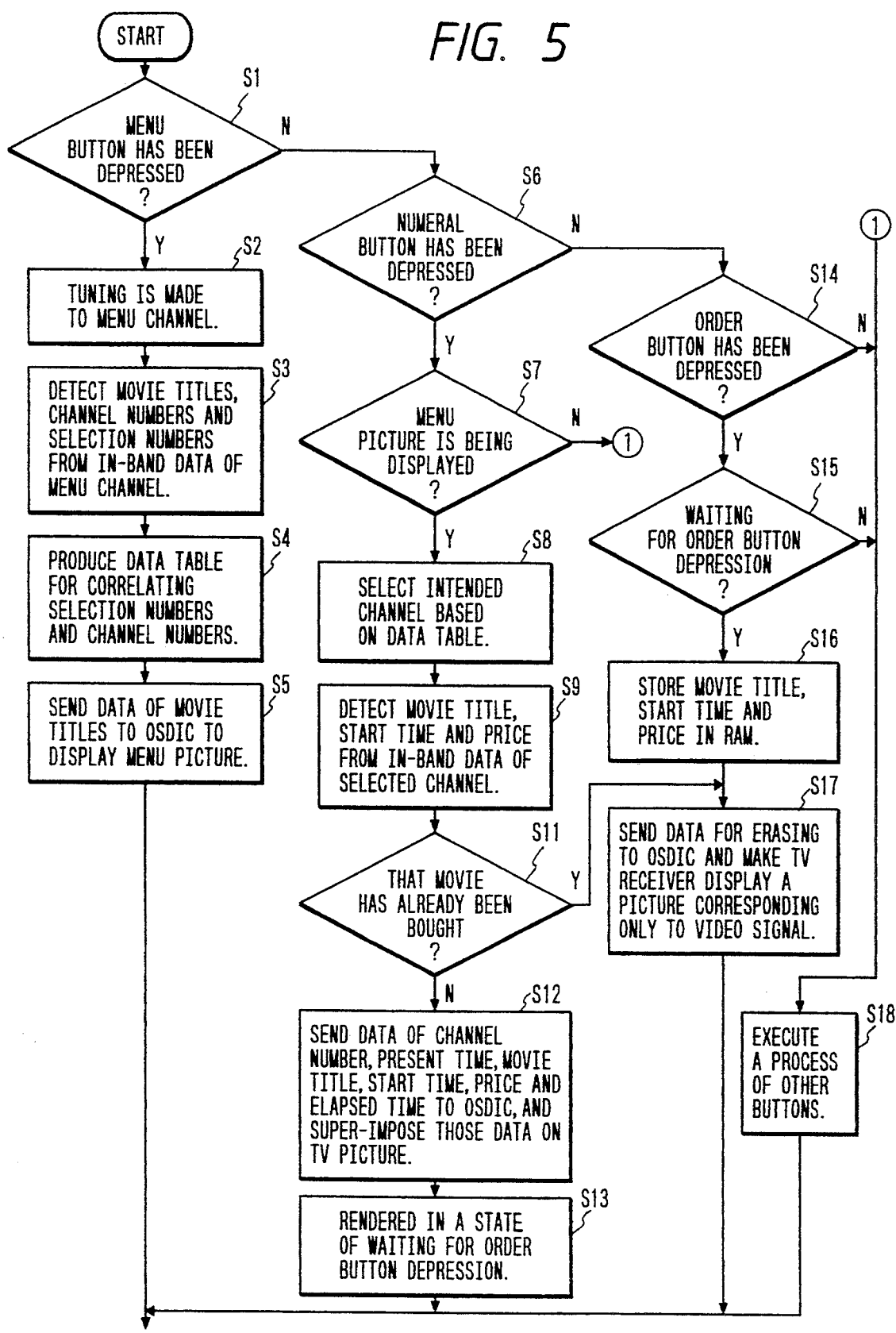
FIG. 5 is a flowchart showing an operation of a terminal apparatus in a first embodiment of the invention.
Figure 8:
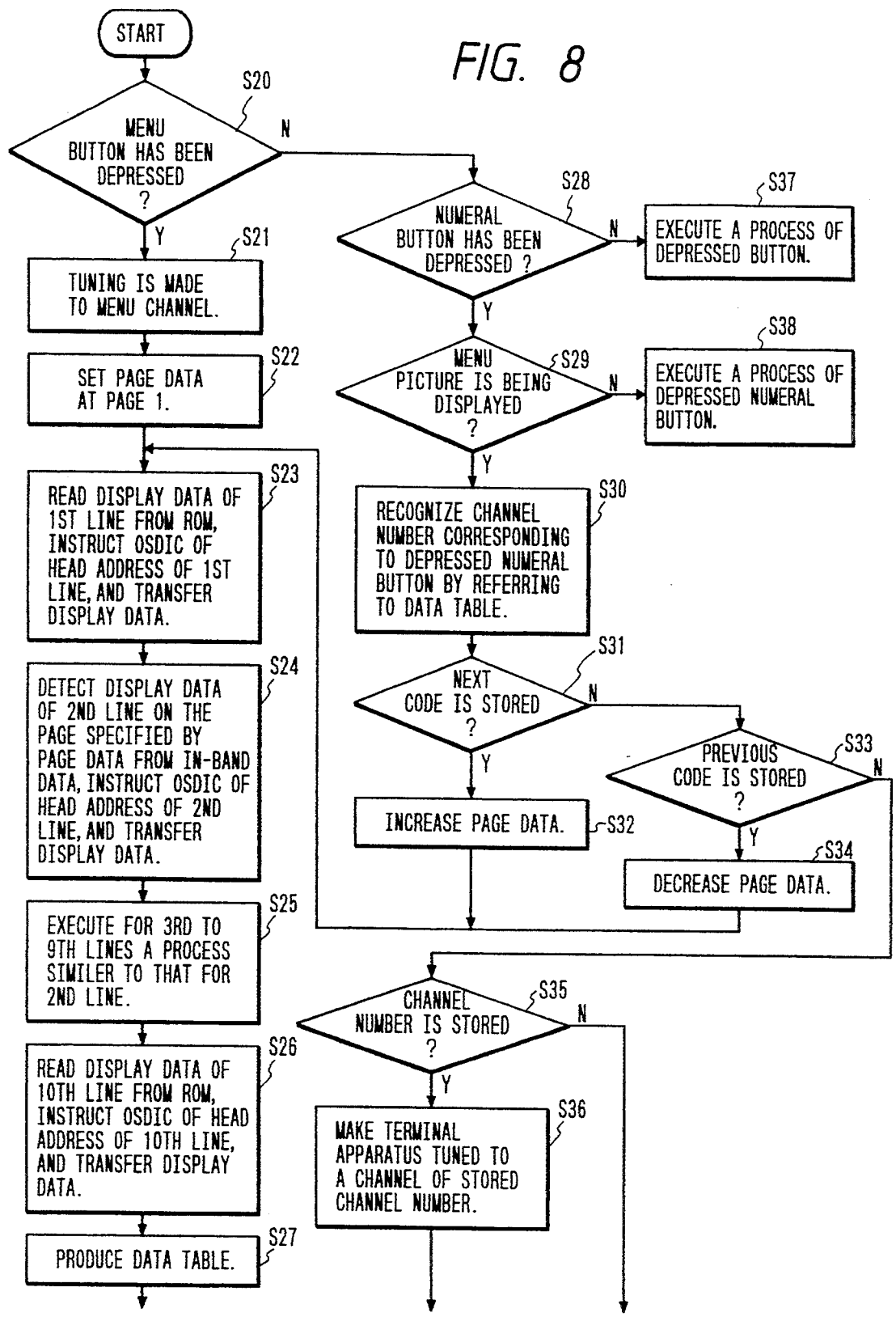
FIG. 8 is a flowchart showing an operation of a terminal apparatus in a second embodiment.

Referring to a flowchart of FIG. 5, the CPU 25 first judges whether the menu button $K_2$ of the keyboard 29 or remote controller 35 has been depressed (step S1). If the judgment is negative, the process goes to step S6 (described later). If the judgment is affirmative, tuning is made to a menu channel (step S2), a number of which is transmitted from the center facility 101 and stored in a RAM (not shown) of the memory 26 in advance, is selected. Character data of broadcast programs and channel data of the respective broadcast programs are superimposed, as in-band data, on a television signal on the menu channel.

For example, the CPU 25 detects, from the in-band data on the menu channel, titles of movies, channel numbers and selection numbers (step S3). Then, the CPU 25 produces a data table for correlating the channel numbers with the selection numbers (step S4). More specifically, data tables as shown in FIGS. 6(a) and 6(b) are produced.

Then, the CPU 25 sends data of the movie titles to the on-screen control IC 31 to have a menu screen as shown in part (a) of FIG. 7 displayed on the TV receiver 3 (step S5), and is rendered in a waiting state.

When a viewer has input a number of a desired program using a numeral button, it is judged, after execution of steps S1 and S6, whether a menu picture is being displayed (step S7). If the judgment is negative, a process corresponding to the depressed number is executed (step S18). If the judgment is affirmative, tuning is made to the intended channel on the basis of the data table of FIG. 6(a) or 6(b) (step S8). For example, using the data table of FIG. 6(a), tuning is made to channel "91" when numeral button "3" has been depressed.

After the channel selection, the CPU 25 detects a title, a broadcast start time and a price of a movie from the in-band data on the selected channel (step S9). Then, it is judged whether the program (i.e., movie) of the selected title has already been bought (step S11). If the judgment is affirmative, data for erasing is sent to the on-screen control IC 31, and TV receiver 3 displays a picture corresponding only to the video signal (step S17).

If the judgment is negative, the data of the channel number, present time, movie title, broadcast start time, price, elapsed time from the start time, etc. are sent to the on-screen control IC 31, and those data are superimposed on a picture of the TV receiver 3 (step S12). Where channel 91 has been selected as in the above case, a picture as shown in FIG. 7(b) is displayed. Then, the CPU 25 is rendered in a state of waiting for a depression of the order button $K_3$ (step S13).

After execution of steps S1 and S6, the CPU 25 judges whether the order button $K_3$ has been depressed (step S14). If the judgment is negative, i.e., if a button other than the order button $K_3$ has been depressed, a process corresponding to the depressed button is executed (step S18). If the judgment is affirmative, it is judged whether the CPU 25 is in the state of waiting for a depression of the order button $K_3$ (step S15).

If the judgment in step S15 is affirmative, the CPU 25 stores the movie title, broadcast start time and price in a RAM (step S16), and sends data for erasing to the on-screen control IC 31 to have a picture corresponding only to the video signal displayed on the TV receiver 3 (step S17). As a result, as shown in FIG. 7(c), only an image of channel 91 is displayed on the TV receiver 3. Thereafter, the selected program becomes viewable upon reaching its start time.

As described above, according to the first embodiment, since a desired program can be selected by a simple input operation in accordance with instructions appearing in a displayed picture, the procedure for program selection on the terminal apparatus side can be simplified. Further, since it is not necessary to distribute in advance pamphlets on which programs are printed, a cost for preparing such pamphlets can be saved and the program organization can be made flexible.

In a second embodiment of the invention, in addition to the operation of the first embodiment, fixed messages for the menu picture are stored in advance in a ROM of the terminal apparatus 102, and only variable messages and display control data are transmitted from the center facility 101. In the following description, it is assumed that 10-line messages are displayed on the TV receiver 3 of the terminal apparatus 102 and messages to appear on the first and tenth lines are fixed ones.

The operation of the second embodiment is described with reference to FIGS. 8–11.

First, the CPU 25 judges whether the menu button $K_2$ has been depressed (step S20). If the judgment is negative, the process goes to step S28 (described later). If the judgment is affirmative, the CPU 25 reads out a menu channel number, which has been transmitted from the center facility 101 and stored in the RAM (not shown) of the memory 26 in advance, and tuning is made to the selected channel (step S21).

Then, page data is set at page one (step S22). The page data is to specify one of a plurality of pictures that can be displayed on the TV receiver 3.

Since display data of the first line on the first page has fixed contents, i.e., it is a fixed message, the CPU 25 reads the display data from a ROM (not shown) of the memory 26, instructs the on-screen control IC 31 of a head address of the first line, and transfers the display data (step S23). With this operation, a fixed message is displayed on the TV receiver 3 based on the display data. For example, in the case of a display picture as shown in part (a) of FIG. 9, "PAY PER VIEW MENU" is displayed on the first line.

Then, the CPU 25 detects display data of the second line on the page specified by the page data (in this case, page one) from the in-band data (described later), instructs the on-screen control IC 31 of a head address of the second line, and transfers the display data (step S24). More specifically, as shown in FIG. 10(a), the CPU 25 specifies the head address by address data of 1 byte, and transfers the display data in the form of a sequence of 1-byte character codes. As shown in FIG. 10(b), the head address of the first line is "0."

In this case, the in-band data ID as shown in FIG. 11 is transmitted from the center facility 101. In the in-band data ID, display position data DPD of 1 byte includes page number data PD indicating a page to be displayed and line number data LD indicating a line number of a line on the page indicated by the page number data PD on which line the display data is to be displayed. A display code DC of 24 bytes (corresponding to 24 characters) indicates the display data that should be displayed at the position specified by the display position data DPD. Data for plural lines are sequentially transmitted. For example, where the page number data PD is "1" and the line number data LD is "3," a character sequence indicated by the display code DC (consisting of a plurality of character codes) is displayed on the third line of the first page.

Display processes for the third to ninth lines are similar to the process for the second line (step S25).

The CPU 25 reads display data of the tenth line from the ROM (not shown) of the memory 26, instructs the on-screen control IC 31 of a head address of the tenth line, and transfers the display data (step S26). For example, as shown in part (a) of FIG. 9, "TO EXIT PRESS MENU" is displayed on the tenth line.

Then, the CPU 25 produces a data table for correlating selection numbers with channel numbers (step S27). More specifically, the tables as shown in FIGS. 6(a) and 6(b) are produced.

If it is judged in step S20 that the menu button $K_2$ has not been depressed, it is then judged whether a numeral button has been depressed (step S28). When a button other than the numeral buttons has been depressed, a process corresponding to the depressed button is executed (step S37).

When a numeral button has been depressed, it is judged whether a menu picture is being displayed (step S29). If the judgment is negative, a process corresponding to the depressed numeral button is executed (step S38). If the judgment is affirmative, the CPU 25 recognizes a channel number corresponding to the depressed numeral button by referring to the data tables of FIG. 6(a) and 6(b) (step S30). For example, if the numeral button "1" is depressed, which means that the selection number is "1," channel number "89" is recognized.

Then, referring to the data table, it is judged whether a next page code (next code) is stored in an area for storing a channel number corresponding to the above selection number (step S31). If the judgment is affirmative, the page data is increased (step S32), and the process goes to step S23. More specifically, if, for example, the data table is the one as shown in FIG. 6(a), and if number "9" has been selected, in which case the next page code "FE" is stored instead of a channel number, one is added to the page data to display the data of the next page.

If the judgment in step S31 is negative, it is judged whether the depressed numeral button corresponds to a previous page code (previous code) (step S33). If the judgment is affirmative, the page data is decreased (step S34), and the process goes to step S23. More specifically, if the data table is the one as shown in FIG. 6(b), and if number "8" has been selected, in which case the previous page code "FD" is stored instead of a channel number, one is subtracted from the page data to display the data of the previous page.

If the judgment in step S33 is negative, it is judged whether a channel number is stored (step S35). If the judgment is negative, the CPU 25 is rendered in a state of waiting for an input. If the judgment is affirmative, the terminal apparatus 102 is tuned to a channel of the selected channel number (step S36), and the process is finished.

As described above, according to the second embodiment, since the fixed messages are stored in advance in a memory, such as a ROM, of the terminal apparatus 102, the amount of the display control data to be transmitted from the center facility 101 can be reduced, i.e., the communication efficiency can be improved. Further, the capacity of buffer memories for receiving of the terminal apparatus 102 can be reduced, which means simplification of the system.

Although in the second embodiment a fixed message is set on a line basis, parts of a certain line may be selected as fixed message parts and a variable message such as a time may be inserted into a fixed message. In this case, the 1-byte address data of FIG. 10(a) specifies the head address corresponding to the head position of the character codes to be inserted. For example, in the case of displaying five characters starting from the tenth character position of the fourth line, the tenth character position is specified by the head address.

In the following, a third embodiment of the invention is described with reference to FIGS. 12–15. It is assumed that a user started to watch a movie titled "AAA" on channel 11 at 10:30 and stopped watching it at 11:35 to meet a visitor, and he attempts to view the rest of the same movie from 12:00.

Operation at the time of viewing suspension

Figure 12:
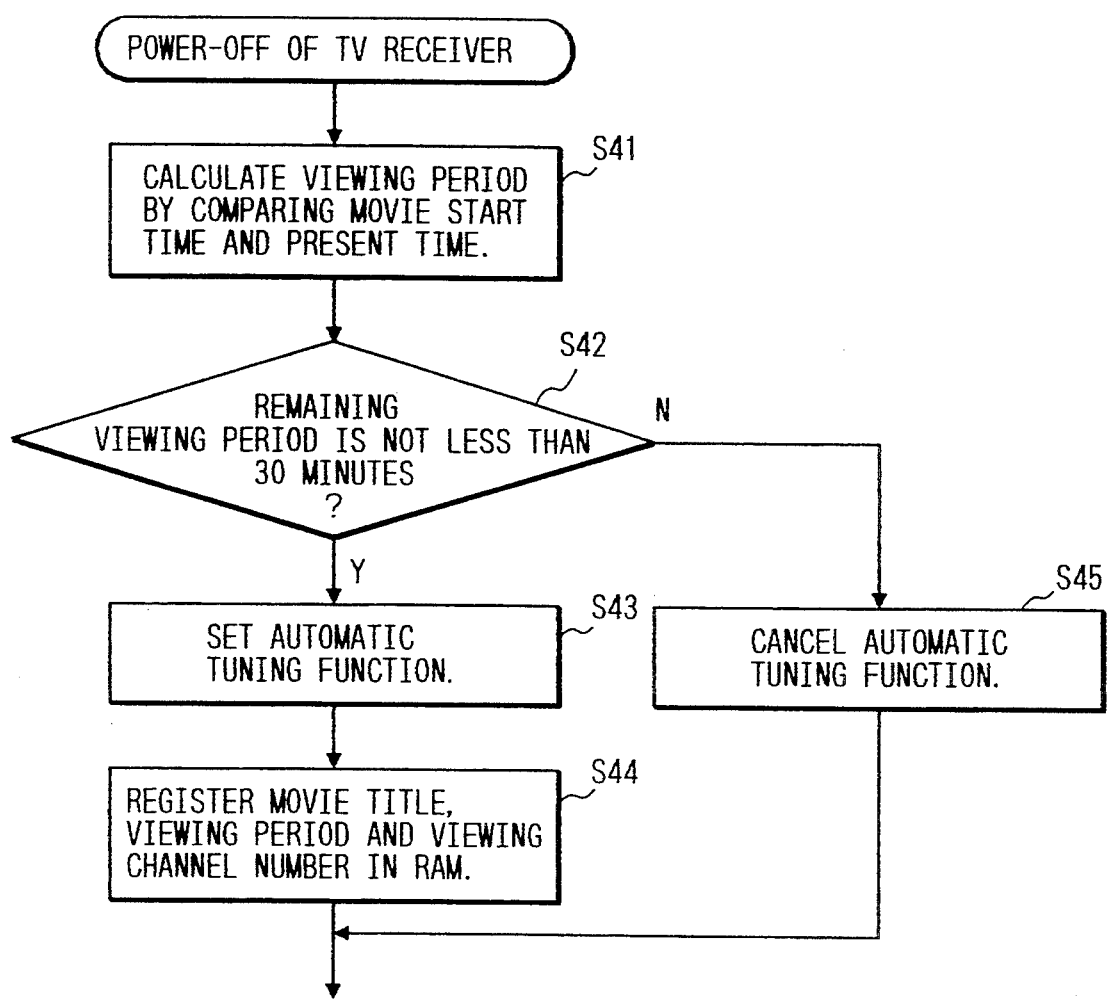
FIG. 12 is a first part of a flowchart showing an operation of a terminal apparatus in a third embodiment.

Referring to FIG. 12, the CPU 25 first recognizes viewing suspension, i.e., power off of the TV receiver 3 by detecting turning off of a power supply current to the TV receiver 3 by a current detector or the like. Further, the CPU 25 calculates a viewing period by comparing the start time (10:30) of the movie that is obtained from the in-band data and the present time (11:35) that is provided by a built-in clock etc. (step S41). More specifically, the viewing period is calculated as:

$$\text{viewing period} = 11:35 - 10:30 = 1:05.$$

The in-band data is transmitted while being incorporated in a frequency band of each channel by superimposing it on the audio signal by amplitude-modulating the FM audio carrier, or by superimposing it on the 18th and 19th blank horizontal flyback lines of the video signal.

Referring to FIG. 13, a structure of the in-band data ID is described. Each of in-band data $ID_1$–$ID_4$ has link data LD indicating a number of a channel for the reviewing after suspension (i.e., a channel to be linked) on which the movie of the same title is scheduled to be broadcast from a start time closest to that of the viewing-suspended broadcast among the channels on which the same movie is scheduled to be broadcast. The link data LD may include numbers of all the related channels. Further, each in-band data includes first program data $PD_1$ consisting of a title, start time and length of a program (e.g., movie) being broadcast, and second program data $PD_2$ consisting of a title, start time and length of a program (e.g., movie) to be broadcast next time. For example, in the case of channel "11," the link data LD indicates that the number of a channel to be linked is "12." The first program data $PD_1$ indicates that the title of a currently broadcast program (movie) is "AAA," it starts at 10:30, and its length of two hours. The second program data $PD_2$ indicates that the title of a program (movie) to be broadcast next time is also "AAA," its start time is 12:30, and its length is two hours. The link data LD of "FF" means non-existence of a channel to be linked.

Returning to FIG. 12, the CPU 25 judges whether the remaining viewing period of the movie is not less than 30 minutes (step S42). More specifically, the CPU 25 detects the length of the movie from the in-band data, and calculates the remaining viewing period by subtracting the viewing period obtained in step S41 from this length.

If the judgment in step S42 is negative, regarding the viewing of the movie as completed, the CPU 25 cancels the automatic tuning function (step S45). If the judgment is affirmative, the CPU 25 sets the automatic tuning function (step S43), and registers the movie title, viewing period and viewing channel number in a RAM (not shown) of the memory 26 (step S44).

Operation at the time of viewing restart

Figure 14:
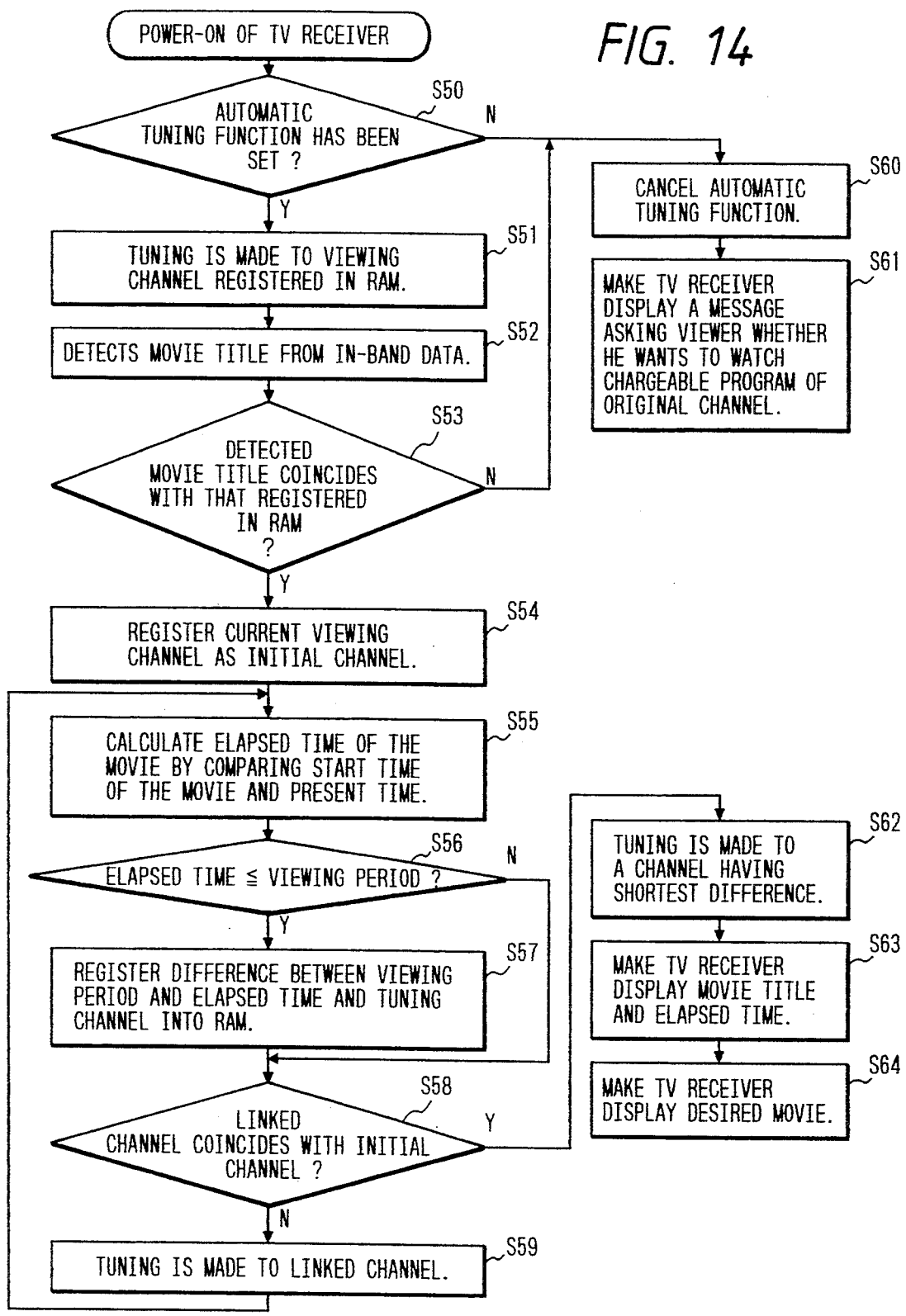
FIG. 14 is a second part of the flowchart showing the operation of the terminal apparatus in the third embodiment.

Referring to FIG. 14, upon the power-on of the TV receiver 3, the CPU 25 judges whether the automatic tuning function has been set (step S50). If the judgment is negative, the CPU 25 cancels the automatic tuning function, and makes the TV receiver 3 display a message to ask the viewer whether he wants to watch a chargeable program on the original channel (step S61).

Figure 15:
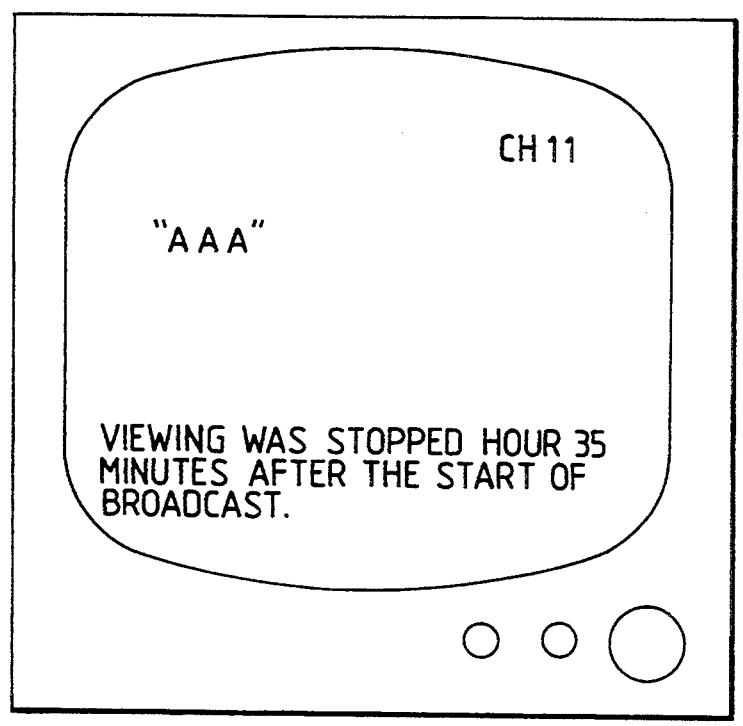
FIG. 15 shows an example of a picture appearing on the TV receiver.
Figure 16:
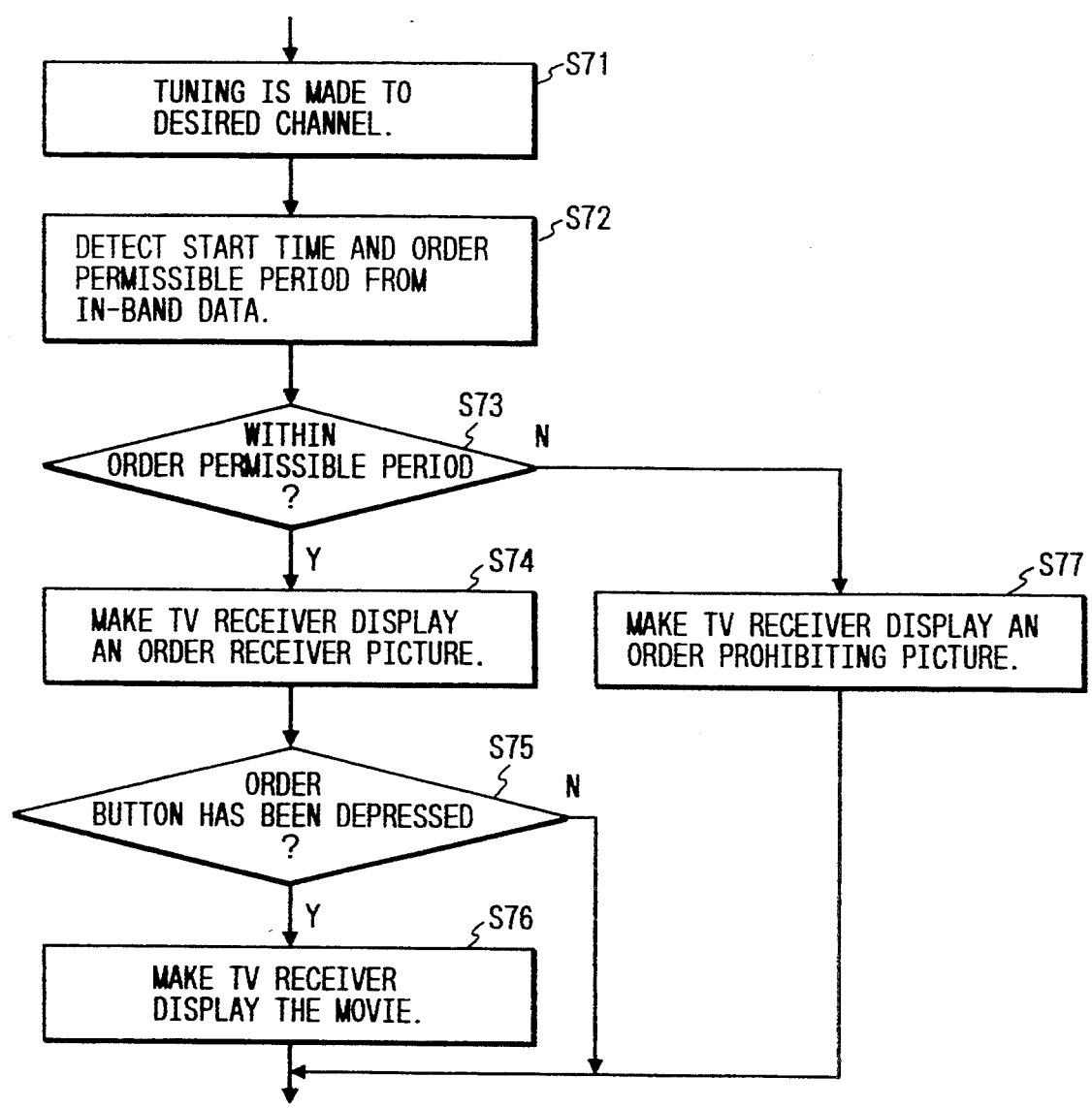
FIG. 16 is a flowchart showing an operation of a terminal apparatus in a fourth embodiment.

If the judgment in step S50 is affirmative, the CPU 25 reads the movie title, viewing period and viewing channel number from the RAM (not shown) of the memory 26, makes the TV receiver 3 display a picture as shown in FIG. 15, and is rendered in a state of waiting the viewer to decide whether to watch the same program as the viewing-suspended program. If the viewer decides, by depressing the selection switch of the keyboard 29 or remote controller 35, to watch the same program, tuning is made to the channel of the readout viewing channel number (step S51). In the above example, the tuning is made to channel 11.

Then, the CPU 25 detects the movie title from the in-band data of the channel (channel 11) thus tuned to (step S52), and judges whether the detected movie title coincides with that registered in the RAM (step S53). If the judgment is negative, the automatic tuning function is canceled (step S60) and a normal process is performed since the link data LD of that channel is irrelevant and the desired program cannot be viewed.

If the judgment is affirmative, the current viewing channel is registered as the initial channel (step S54). In the above example, channel 11 becomes the initial channel.

Then, the CPU 25 calculates an elapsed time from the start of the viewing-suspended movie ("AAA") by comparing the start time (10:30) of the movie and the present time (12:00) (step S55). In the above example, the elapsed time is 1 hour 30 minutes.

Then, the CPU 25 judges whether the elapsed time is shorter than or equal to the viewing period (step S56). In the above example, the elapsed time (1 hour 30 minutes) is longer than the viewing period (1 hour 5 minutes).

If the judgment is negative, the process goes to step S58. If the judgment is affirmative, the CPU 25 registers a difference obtained by subtracting the elapsed time from the viewing period and the number of the channel now tuned to (step S57).

Then, the CPU 25 judges whether the channel to be linked is equal to the initial channel (step S58). If the judgment is negative, tuning is made to the channel to be linked (step S59), and the process returns to step S55 to repeat steps S55-S59.

If the judgment in step S58 is affirmative, tuning is made to a channel having the shortest difference time (viewing period minus elapsed time) (step S62). In the above example, channel 12 is selected. Further, the CPU 25 makes the TV receiver 3 display the movie title and the elapsed time (step S63), and then the desired program (step S64).

As described above, according to the third embodiment, even where a viewer stopped watching a certain program, when he intends to restart watching the same program the terminal apparatus 102 is automatically tuned to a channel on which the same program is to be broadcast with an elapsed time that is close to a viewing period at the time of the suspension. Even in the case of the PPV (pay per view) charging system, in which a user is charged on a program-by-program basis, the third embodiment will contribute to avoiding complaints from subscribers, thereby providing practical advantages in operating the CATV system.

Although in the third embodiment the link data and the first and second program data are transmitted in the form of in-band data, they may be sent in the form of out-band data. Further, in the third embodiment, a channel having the shortest difference time between the viewing period and the elapsed time is selected even where the total viewing period becomes shorter than the length of the program, i.e., there occurs a portion that cannot be viewed. The third embodiment can be modified such that by performing a proper calculation using the remaining viewing period a channel is selected only in the case where the total viewing period becomes longer than the length of the program, i.e., there occurs a portion that is doubly viewed.

Referring to FIGS. 16–18(b), the operation of the terminal apparatus 102 in a fourth embodiment of the invention is described.

When a viewer selects a desired channel by operating the keyboard 29 or remote controller 35 (step S71), the CPU 25 detects a start time and an order permissible period of a program being received from the in-band data on the selected channel (step S72).

A structure of the in-band data is described with reference to FIG. 17.

For example, the in-band data ID includes order permissible period data AP indicating a permissible period during which a viewer can make an order, for a movie being broadcast that includes first program data $PD_1$ indicating a title, start time and length of a movie being broadcast, and second program data $PD_2$ indicating a title, start time and length of a movie to be broadcast next time. More specifically, for example the following data are transmitted as the in-band data ID: 1:30 as the order permissible period AP; a movie title "AAA," a start time 10:00 and a length 2:00 as the first program data $PD_1$; and a movie title "BBB," a start time 12:00 and a length 2:00 as the second program data $PD_2$.

Returning to FIG. 16, the CPU 25 recognizes the present time from the FSK receiver 24, a built-in clock (not shown), etc., subtracts, from the present time, the start time of the movie that is obtained from the in-band data ID, and judges whether a difference thus obtained is within the order permissible period that is represented by the order permissible period data AP (step S73). If the judgment is affirmative, steps S74–S76 are executed. If the judgment is negative, step S77 is executed.

Difference is within order permissible period

For example, if the above-exemplified in-band data ID is being transmitted, and if that channel is selected at 11:00, the difference between the present time and the start time of the movie, i.e., the elapsed time is calculated as:

$$\text{difference} = 11:00 - 10:00 = 1:00.$$

Since the difference is shorter than the order permissible period represented by the order permissible period data AP (1:30), an order receiving picture as shown in FIG. 18(a) is displayed on the TV receiver 3 (step S74). That is, there are displayed the title ("AAA") of the movie being broadcast, the elapsed time (1:00) from the start of the broadcast, and a message announcing that now the user can order this program.

In step S74, the picture is prepared by combining the variable character data of "AAA" and "1 HOUR" with the fixed character data that is read from the memory 26 connected to the CPU 25.

Then, the CPU judges whether the order button $K_3$ has been depressed (step S75). If the judgment is affirmative, the CPU 25 judges that the movie has been ordered, and makes the TV receiver 3 display the movie (step S76).

If the judgment in step S75 is negative, i.e., if a predetermined time has passed without depression of the order button $K_3$, or another button has been depressed, the CPU 25 finishes the display of the order receiving picture and makes the TV receiver 3 display a picture for prompting the user to depress a channel button of another channel.

Difference is longer than order permissible period

It is assumed that the channel is selected at 11:45 while the in-band data is being transmitted. In this case, the difference between the present time and the start time of the movie, i.e., the elapsed time is calculated as:

$$\text{difference} = 11:45 - 10:00 = 1:45.$$

Since the difference thus calculated is longer than the order permissible period that is represented by the order permissible period data AP (1:30), the CPU 25 makes the TV receiver 3 display a picture for prohibiting an order as shown in FIG. 18(b) (step S77). That is, there are displayed the title ("BBB") of the movie to be broadcast next time, a time (0:15) until the start of the movie, and a message for announcing that the user cannot order the movie "AAA" at the present time. As in the above case, this picture is prepared by combining the variable character data and the fixed character data. Further, to prompt the user to order the program next time, this picture may be superimposed, for several tens of seconds, on a descrambled movie picture.

As described above, according to the fourth embodiment, since a user cannot order a program after passage of the order permissible period from the start of the program, it can be avoided that a user is charged a full charge of the program even if he has ordered it only a short time before the end of the program. Therefore, there can be avoided charge-related troubles between a CATV broadcasting company and subscribers. This will contribute to promoting a trustful relationship between those, as a result of which the CATV system will be operated more satisfactorily. Further, since a name (movie title) and a start time of a next program are displayed during the order-prohibited period, a user need not refer to a program table, providing ease in ordering a program.

What is claimed is:

1. A CATV system comprising:
a center facility for transmitting, together with television signals of a plurality of programs, display control data indicating program names of the respective programs and channel data indicating numbers of channels on which the respective programs are being broadcast or to be broadcast; and
a plurality of terminal apparatuses, each comprising:
means for detecting the program names and the corresponding channel numbers from the display control data and the channel data;
display means for making a TV receiver display the detected program names;
means for receiving an instruction indicating selection of one of the program names being displayed on the TV receiver;
means for tuning, based on the detected channel numbers, the terminal apparatus to a channel on which the selected program is being broadcast or to be broadcast; and
means for storing character data indicating a fixed message, said means for storing character data comprising a ROM;
wherein the display means makes the TV receiver display a picture containing the detected program names and fixed messages based on display data obtained by converting the character data read from the ROM; and
wherein the fixed messages are displayed at locations according to the received display control data.

2. The CATV system of claim 1, wherein selection numbers are associated with the respective program names, and one of the program names is selected by specifying a corresponding selection number appearing on the TV receiver.

3. A CATV terminal apparatus comprising:
means for detecting program names of a plurality of programs and numbers of channels on which the respective programs are being broadcast or to be broadcast, from display control data and channel data transmitted from a CATV center facility together with television signals of the programs;

display means for making a TV receiver display the detected program names;

means for receiving an instruction indicating selection of one of the program names being displayed on the TV receiver;

means for tuning, based on the detected channel numbers, the terminal apparatus to a channel on which the selected program is being broadcast or to be broadcast; and means for storing character data indicating a fixed message, said means for storing character data comprising a ROM;

wherein the display means makes the TV receiver display a picture containing the detected program names and fixed messages based on display data obtained by converting the character data read from the ROM; and wherein the fixed messages are displayed at locations according to the received display control data.

4. The CATV system of claim 3, wherein selection numbers are associated with the respective program names, and one of the program names is selected by specifying a corresponding selection number appearing on the TV receiver.

5. A CATV system comprising:

a center facility for transmitting a plurality of television signals of the same program on different linked channels at different periods, and for transmitting first data together with each of the television signals, the first data including link data indicating at least one of the linked channels having a predetermined linking relationship with an associated channel, and start time data indicating a start time of the program on the associated channel; and a plurality of terminal apparatuses, each comprising:

means for receiving a television signal of the program transmitted on a first channel;

means for calculating, when viewing of the program on the first channel is stopped, a viewing period from the start time that is obtained from the start time data to a viewing suspension time;

means for automatically calculating, when an attempt of restarting the viewing of the program is made, elapsed times from the start times of the program on the respective linked channels that are selected based on the link data to a time of the restarting attempt, the start times being obtained from the start time data; and means for tuning the terminal apparatus to one of the linked channels based on differences between the viewing period and the calculated elapsed times.

6. The CATV system of claim 5, wherein the tuning means tunes the terminal apparatus to a channel having a smallest difference among the differences.

7. The CATV system of claim 5, wherein the tuning means tunes the terminal apparatus to a channel having a smallest difference among a part of the differences in which the calculated elapsed time is shorter than the viewing period.

8. A CATV system comprising:

a center facility for transmitting, together with a television signal of a program, first data indicating an order permissible period during which the program can be ordered and second data indicating a start time of the program; and a plurality of terminal apparatuses, each comprising:

means for calculating an elapsed time from the start time of the program that is obtained from the second data to a present time;

means for prohibiting an order of the program when the elapsed time is outside the order permissible period that is obtained from the first data; and means for tuning the terminal apparatus to a channel on which the television signal of the program is transmitted, when the program has been ordered.

9. A CATV system comprising:

a center facility for transmitting television signals of a plurality of programs, and for transmitting on a menu channel display control data indicating program names of the respective programs and channel data indicating numbers of channels on which the respective programs are being broadcast or to be broadcast; and a plurality of terminal apparatuses, each comprising:

a menu button;

means for tuning, upon depression of the menu button, the terminal apparatus to the menu channel based on a menu channel number stored in a memory;

means for detecting the program names and the corresponding channel numbers from the display control data and the channel data transmitted on the menu channel;

display means for making a TV receiver display the detected program names;

means for receiving an instruction indicating selection of one of the program names being displayed on the TV receiver; and said means for tuning, based on the detected channel numbers, the terminal apparatus to a channel on which the selected program is being broadcast or to be broadcast.

10. A CATV terminal apparatus comprising:

a menu button;

means for tuning, upon depression of the menu button, the terminal apparatus to a menu channel based on a menu channel number stored in a memory, wherein display control data indicating program names of programs and channel data indicating numbers of channels on which the respective programs are being broadcast or to be broadcast from a center facility, are transmitted on the menu channel;

means for detecting the program names of a plurality of programs and the numbers of channels on which the respective programs are being broadcast or to be broadcast from the display control data and the channel data transmitted from the center facility on the menu channel together with television signals of the programs;

display means for making a TV receiver display the detected program names;

means for receiving an instruction indicating selection of one of the program names being displayed on the TV receiver; and said means for tuning, based on the detected channel numbers, the terminal apparatus to a channel on which the selected program is being broadcast or to be broadcast.

* * * * *